United States Patent [19]

Kumming

[11] 4,167,823

[45] Sep. 18, 1979

[54] COAGULATION PUZZLE FOR TEACHING COAGULATION THEORY

[76] Inventor: Deborah G. Kumming, 715 R North St., Cape Girardeau, Mo. 63701

[21] Appl. No.: 917,642

[22] Filed: Jun. 21, 1978

[51] Int. Cl.$^2$ .......................... G09B 23/28; A63F 9/06
[52] U.S. Cl. .......................................... 35/17; 273/156
[58] Field of Search ................ 35/17, 73; 273/153 R, 273/153 P, 156, 157 R, 154

[56] References Cited

U.S. PATENT DOCUMENTS

| | | | |
|---|---|---|---|
| 2,981,009 | 4/1961 | Lindquist | 35/17 |
| 2,996,832 | 8/1961 | Rubin | 273/157 R X |
| 3,271,879 | 9/1966 | Sackler | 35/17 |
| 3,614,106 | 10/1971 | Morrison | 273/156 |

*Primary Examiner*—William H. Grieb
*Attorney, Agent, or Firm*—Grace J. Fishel

[57] ABSTRACT

A puzzle for teaching coagulation theory including three separable units representing the intrinsic, extrinsic and common coagulation pathways. Each of said units further including separable members representing the coagulation factors, said members, when assembled correctly, representing the order in which the factors interact.

9 Claims, 6 Drawing Figures

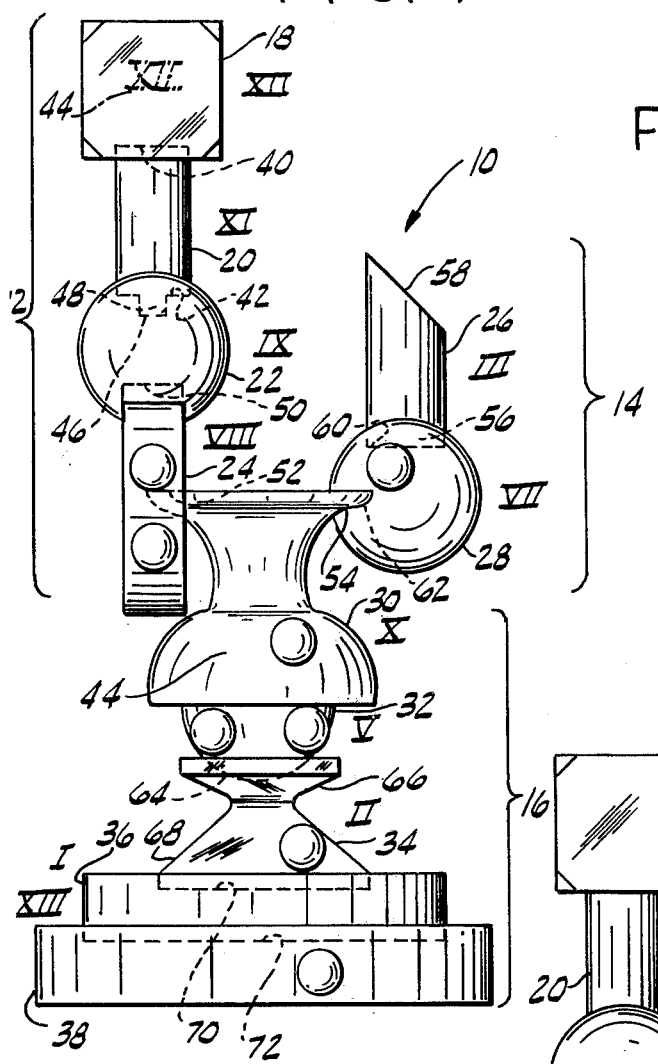
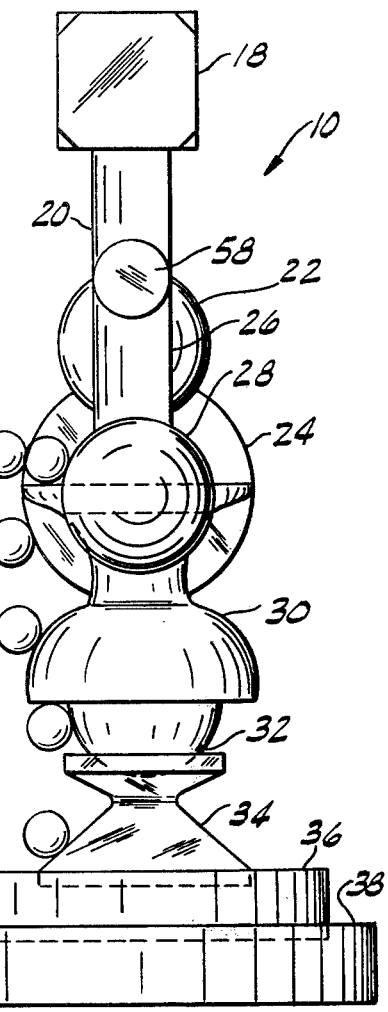
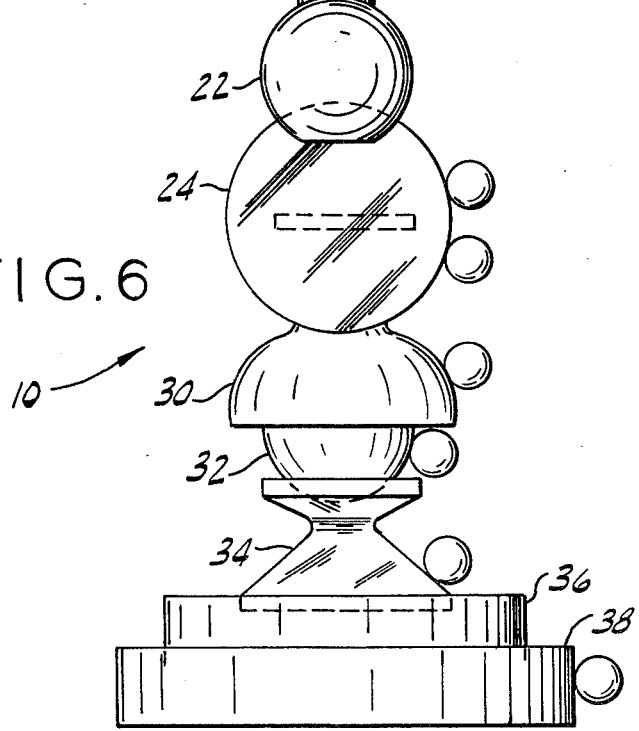

COAGULATION PUZZLE FOR TEACHING COAGULATION THEORY

This invention relates to a kit which may be used in teaching coagulation theory by constructing a model of the steps involved in formation of a fibrin clot.

The process by which blood coagulates is highly complex. A basic knowledge of this subject, however, is needed by medical doctors, laboratory technicians and other medical personnel as a necessary tool in diagnosing and treating coagulation deficiencies.

Learning the coagulation process has been made more difficult by the large number of different names given to the 12 coagulation factors. In order to avoid this confusion, the International Committee on Nomenclature of Blood Clotting Factors has established a nomenclature. Each of the 12 factors has been given a Roman numeral. Several anomalies still remain, however. Among these, the 12 factors are numbered I through XIII, omitting Factor VI, accelerin, which is no longer considered as one of the coagulation factors. Another anomaly in the numbering system is that the factors do not interact in numerical order. The numbers, rather, were assigned in the order that the factors were identified. Listed in Table 1 are the numbers assigned by the committee, along with the most commonly used name for each factor.

Table 1

| Coagulation Factors | |
|---|---|
| Number | Common Name |
| I | Fibrinogen |
| II | Prothrombin |
| III | Tissue thromboplastin, thrombokinase |
| IV | Calcium |
| V | Proaccelerin, labile factor |
| VII | Proconvertin, stable factor |
| VIII | Antihemophilic A factor (AHF), antihemophilic globulin (AHG) |
| IX | Antihemophilic B factor (AHB), plasma thromboplastin component (PTC), Christmas factor |
| X | Stuart factor, Stuart-Prower factor |
| XI | Plasma thromboplastin antecedent (PTA) |
| XII | Hageman factor, contact factor |
| XIII | Fibrin stabilizing factor, fibrinase |

Coagulation occurs through one of two systems: the intrinsic system or the extrinsic system. One way in which to visualize this process is to represent it as a cascade of factors acting on each other in a Y-shaped pattern to form as an end product a fibrin clot. This cascade is shown in FIG. 1. As shown in this figure, the left branch of the Y illustrates the intrinsic pathway and the right branch illustrates the extrinsic pathway. The stem of the Y from the point where the intrinsic and extrinsic pathways meet at Factor X, to the formation of the stable fibrin clot, is called the common pathway.

In the intrinsic pathway, which is the pathway most often utilized in coagulation studies, Factor XII is activated in vivo by vascular injury and contact with collagen to become Factor XIIa. The letter "a" after the factor number indicates that the factor is in its active form. In vitro, activation of Factor XII is brought about by surface contact, such as with glass. Factor XIIa acts as an enzyme to convert Factor XI to the activated form XIa. Factor IX is activated by the enzymatic action of Factor XIa and calcium ions, to form Factor IXa. When Factor IX becomes activated, it interacts with Factor VIII, calcium ions, and phospholipids from the platelets designated as PF-3, to enzymatically convert Factox X to its active form Xa. In the extrinsic pathway, tissue thromboplastin (Factor III), calcium ions and Factor VII react with Factor X to convert it to its active form Xa. Activated Factor X starts the common pathway by interacting with Factor V, in the presence of calcium ions and PF-3, to form plasma thromboplastin.

Plasma thromboplastin, with calcium ions, converts prothrombin to thrombin. Fibrin monomers are formed by the action of the thrombin on fibrinogen. These fibrin monomers then polymerize to form a fibrin polymer which is soluble in 5 molar urea. To stabilize the clot, Factor XIII, activated by thrombin and calcium, then converts the fibrin monomer into a more stable state by changing the hydrogen bonds to covalent bonds. The resulting fibrin is insoluble in 5 molar urea.

Part of the difficulty in learning the coagulation process is that it is difficult to visualize it. Therefore, among the several objects of the present invention is the provision of a kit which may be used in teaching coagulation theory by constructing a model of a fibrin clot. Another object is to provide a kit for teaching coagulation theory which may be assembled as a puzzle without any understanding of coagulation theory. Other objects and features will be in part apparent and in part pointed out hereinafter.

The invention accordingly comprises the constructions hereinafter described, the scope of the invention being indicated in the subjected claims. In the accompanying drawings, in which one of various possible embodiments of the invention is illustrated, corresponding numbers refer to corresponding parts throughout the several views of the invention, wherein:

FIG. 4 is a front elevational view like FIG. 3 but without crosshatching;

FIG. 5 is an elevational view of the right side of the puzzle as shown in FIG. 4; and, FIG. 6 is an elevational view of the left side of the puzzle as shown in FIG. 4.

Figure 1:
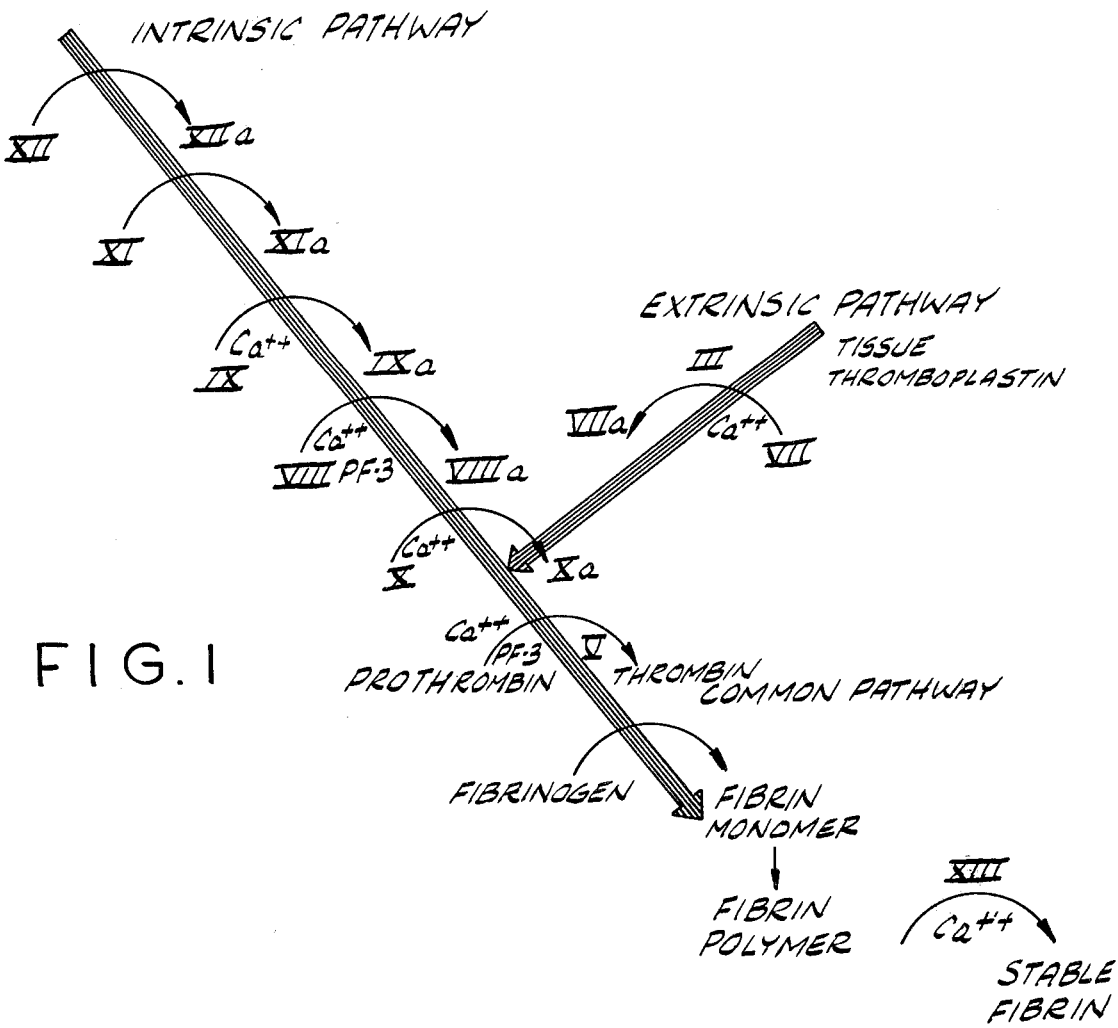
FIG. 1 is a schematic representation of the process in which blood coagulates as described above.
Figure 2:
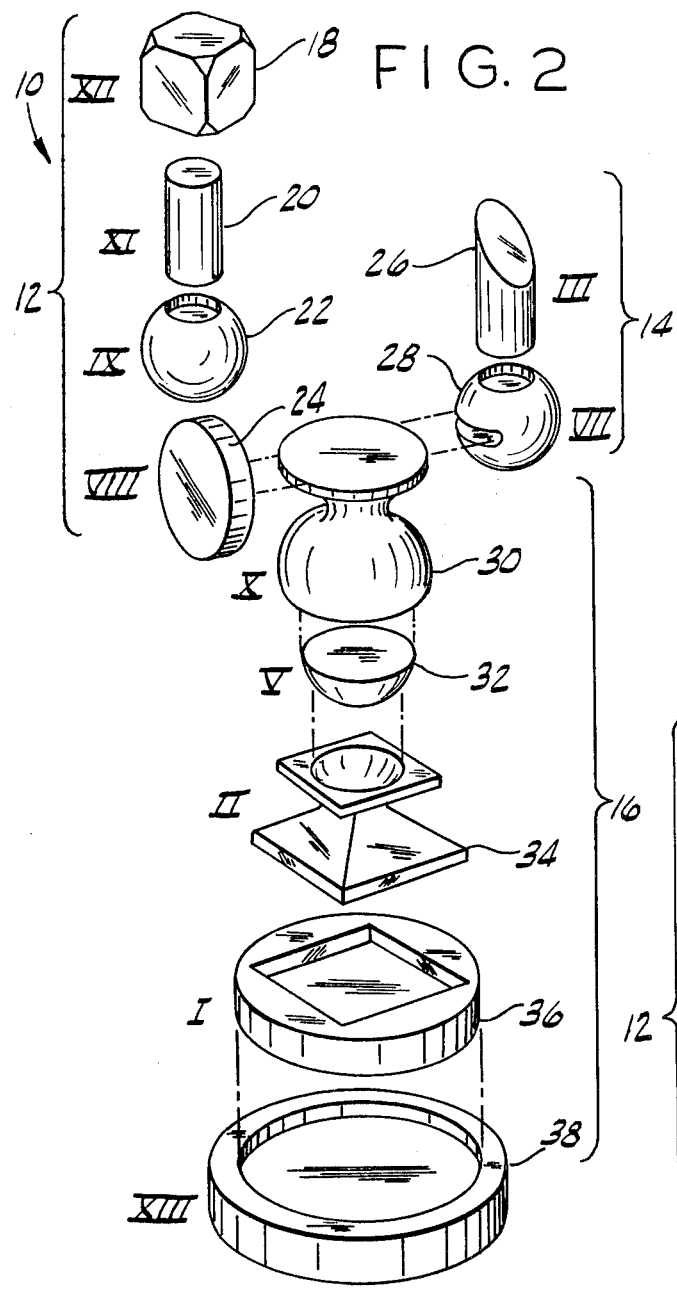
FIG. 2 is an exploded perspective view of a puzzle illustrating the present invention.

Referring to the drawings more particularly by reference character, numeral 10 refers to a puzzle constructed in accordance with the present invention for teaching coagulation theory. Puzzle 10 includes three units 12, 14 and 16. As shown in the drawings, units 12 and 14 are balanced on unit 16 which serves as a support base therefor. Unit 12 represents the intrinsic pathway as shown in FIG. 1 while Units 14 and 16 represent the extrinsic and common pathways, respectively.

Each of Units 12, 14 and 16 includes a plurality of separable members or pieces. Unit 12 namely includes members 18, 20, 22 and 24. These members respectively represent Factors XII, XI, IX and VIII in the intrinsic pathway. Unit 14 includes members 26 and 28 which represent Factors III and VII in the extrinsic pathway. Finally, Factors X, V, II, I and XIII in the common pathway are represented in Unit 16 by members 30, 32, 34, 36 and 38.

Figure 3:
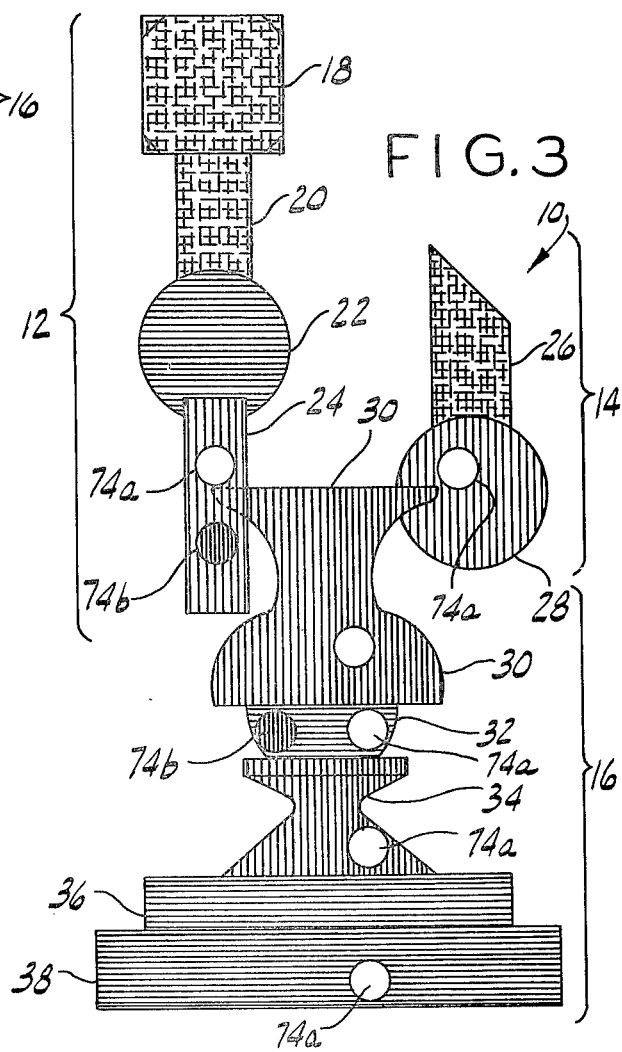
FIG. 3 is a front elevational view of the puzzle crosshatched to show the color of the various parts thereof.

The coagulation factors may be divided into three functional groups based on their properties. As shown in FIG. 3, these functional groups are represented by different colors. The fibrinogen group is shown in blue and consists of Factors I, V, VIII and XIII. These factors, as described above, are represented by members 36, 32, 24 and 38, respectively. Members of the fibrinogen group are consumed during the process of coagulation and are, therefore, absent in serum and present in plasma. Members of the fibrinogen group are not adsorbed out by barium sulfate and vitamin K is not necessary for their synthesis.

With continued reference to FIG. 3, the prothrombin group includes Factors II, VII, IX and X. These factors are shown in red as members 34, 28, 22 and 30, respectively. Vitamin K is necessary for the synthesis of the factors in the prothrombin group. Factors VII, IX and X are not consumed during the coagulation process and are, therefore, present in serum as well as plasma. All four factors are adsorbed out by barium sulfate. The contact group is composed of Factors XI and XII which are shown as yellow members 20 and 18, respectively. Factor III represented by member 26 is arbitrarily shown in yellow. Members of the contact group are not consumed during coagulation, do not depend on vitamin K for synthesis and are not adsorbed out by barium sulfate.

As shown in FIG. 4, cubical member 18 is provided with a recess or notch 40 in one side thereof. Recess 40 is conformably shaped and disposed for mating engagement with cylindrical member 20. Spherical member 22, like member 18, is provided with a recess 42 in one surface thereof for mating engagement with member 20 thus linking 18 with member 22. Since all of members 18-38 include indicia 44 which correspond to the Roman numeral assigned to the factor represented by said member, recesses 40 and 42 and the mating portions of member 20 are shaped differently to prevent inverted assembly of member 20. So provisioned, indicia 44 of member 20 will be right side up as viewed in the drawings. To this end, recess 42 includes a slot 46 for receipt of blade 48 extending from the corresponding mating portion of member 20. To prevent misassembly, no such slot is provided in recess 40.

Opposite recess 42, spherical member 22 includes a second recess formed as slot 50 for mating engagement with the rim of disc-shaped member 24. The thickness of disc 24 is selected such that disc shaped members 36 and 38 may not be interchanged therefor. A horizontal slot 52 is provided part way through one face of member 24. By means of this slot, member 24 is seated in mating engagement on a horizontally extending flange 54 of member 30. Thus it is seen that members 18, 20, 22 and 24 in assembled condition represent the order in which Factors XII, IX, XI and VIII interact. Moreover, it is seen that slot 52 provides the means whereby unit 12 representing the intrinsic pathway is joined at Factor X, represented by member 30, to the common pathway.

As shown in FIG. 4, the extrinsic pathway 14 starts with cylindrically formed member 26. To prevent misassembly of member 26 in inverted position, a mating end 56 is formed perpendicular to the cylindrical surface of the member while a free end 58 is formed at an angle oblique thereto. A recess 60 is conformably shaped and disposed in spherical member 28 for mating engagement with mating end 56 of member 26. At ninety degrees to recess 60, spherical member 28 includes a second recess formed as a slot 62 for mating engagement on horizontally extending flange 54 of member 30.

Surfaces 56 and 58 could, of course, be interchanged or take other forms altogether as long as recess 60 is conformably shaped. When the puzzle is configured as shown in the drawings, the diameter of member 26 at end 56 is selected such that member 20 cannot be interchanged therefor. This is necessary to prevent inadvertent misassembly of puzzle 10 with member 26 fitted into recess 42 and member 20 fitted into recess 60, thus giving an erroneous representation of both the intrinsic and extrinsic pathways which would defeat the teaching function of the puzzle. Whereas when assembled in the order shown, it is seen that members 26 and 28 represent the order in which Factors III and VII interact in the extrinsic pathway comprising unit 14. It is further seen that slot 62 provides the means whereby unit 14 is joined at Factor X to the common pathway.

Member 30, representing Factor X, is shown as a goblet shaped solid with flange 54 forming the inverted base thereof. The particular shape shown, while esthetically pleasing, could be supplanted by some other as long as it provides means for joining units 12 and 14 thereto. While unit 12 is shown on the left and unit 14 is shown on the right as viewed in the drawings, this ordering is not essential but is preferred since it corresponds to the coagulation pathway as usually shown in text books. It is important, however, that the weight of units 12 and 14 be similar so that the units can be balanced on member 30. Alternatively, the bowl of member 30 may be enlarged to prevent tipping of flange 54 may have a variable radius. Stability, however, must be provided somehow since one purpose of the puzzle is to illustrate that the coagulation process is a stable but delicately balanced system.

The bowl of member 30 is shown as balanced on hemisphere 32, which is, in turn, balanced on member 34, a recess 64 for which purpose is provided therein. Member 34 includes an upper, smaller pyramid 66 which is joined at its apex to a lower, larger pyramid 68. Recess 64 as best seen in FIG. 6, is formed in the base of pyramid 66. The base of lower pyramid 68 is fitted into a conformably shaped recess 70 in the upper face of disc shaped member 36. The opposite face of disc shaped member 36 is received in a conformably shaped recess 72 in an upper face of disc shaped member 38. As will be readily appreciated, members 30-38 generally ascend in size so that the puzzle when assembled is stable. On the other hand, it should not be too stable so that assembly is not a challenge.

In assembled condition as shown in the drawings, members 30, 32, 34, 36 and 38 represent the order in which Factors X, V, II, I and XIII interact in the common pathway represented by unit 16. It is seen that puzzle 10 can be assembled without member 38 but that the puzzle is less stable. This illustrates the conversion of the fibrin polymer into a more stable form by polymerization.

From the above, it is apparent that puzzle 10 can be assembled without accounting for the calcium ions or for the phospholipids from the platelets. This is realistic since in coagulation studies there is rarely a deficiency in these members. They are, however, essential to coagulation and are shown in the drawings as pins 74. Pins 74a with white heads represent calcium ions and pins 74b with pink heads represent platelet factor 3 (PF-3). To complete the puzzle, in the intrinsic pathway one of pins 74a and one of pins 74b should be placed on member 24. This illustrates that Factor VIII, PF-3 and calcium ions combine to enzymatically convert Factor X into its active form.

In the extrinsic pathway, one of pins 74a should be placed on member 28 since calcium ions act with Factor VII and Factor III to convert Factor X into Xa. Activated Factor Xa interacts with Factor V, in the presence of calcium ions and platelet phospholipids to form plasma thromboplastin (PCC). Hence, in the common pathway one of pins 74a should be placed on both of members 30 and 32 and one of pins 74b should be placed on member 32. Another of pins 74a should be placed on member 34 since plasma thromboplastin, as aforementioned, with calcium ions, converts prothrombin to thrombin. Finally, the last of pins 74a should be placed on member 38 to illustrate that Factor XIII when activated by thrombin and calcium ions converts the fibrin polymer into a more stable form.

In view of the above, it will be seen that the several objects of the invention are achieved and other advantageous results attained. More particularly, it is seen that puzzle 10 provides a kit consisting of members 18-38 and pins 74 which may be used in teaching coagulation theory by constructing a model of a fibrin clot. As various changes could be made in the above constructions without departing from the scope of the invention, it is intended that all matter contained in the above description, or shown in the accompanying drawings, shall be interpreted as illustrative and not in a limiting sense.

What is claimed is:

1. A kit for constructing a model of a fibrin clot comprising a first unit, a second unit and a third unit, said third unit forming a base for the other two units and having means for joining the second and third units in balanced relationship thereon, said first unit including separable members representing coagulation Factors XII, XI, IX and VIII, said second unit including separable members representing coagulation factors III and VII and said third member including separable members representing coagulation Factors X, V, II and I, said separable members having interengageable means for unique assembly of said members in said units whereby to illustrate the proper order in which said coagulation factors interact.

2. The kit according to claim 1 wherein the third unit further includes a separable member representing coagulation Factor XIII.

3. The kit according to claim 2 wherein the members in the first unit are conformably shaped such that each of the members in said first unit can be assembled in only one order.

4. The kit according to claim 2 wherein the members in the second unit are conformably shaped such that each of the members in said second unit can be assembled in only one order.

5. The kit according to claim 2 wherein the members in the third unit are conformably shaped such that each of the members in said third unit can be assembled in only one order.

6. The kit according to claim 2 wherein the members in the first, second and third units are conformably shaped such that each of the members in said units can be assembled in only one order.

7. The kit according to claim 6 wherein said members have indicia corresponding to the number associated with the coagulation factor represented by said member.

8. The kit according to claim 7 wherein the members are color coded, a first color being associated with Factors I, V, VIII and XIII to represent the fibrinogen group, a second color being associated with Factors II, VII, IX and X to represent the prothrombin group and a third color being associated with Factors XI, XII and III to represent the contact group.

9. The kit according to claim 8 wherein pins represent calcium ions and platelet phospholipids, a first color being associated with the calcium ions and a second color being associated with the platelet phospholipids.

* * * * *

UNITED STATES PATENT AND TRADEMARK OFFICE
CERTIFICATE OF CORRECTION

PATENT NO. : 4,167,823
DATED : September 18, 1979
INVENTOR(S) : Deborah G. Kumming It is certified that error appears in the above-identified patent and that said Letters Patent are hereby corrected as shown below:

Column 2, line 30, "subjected" should read --subjoined--. Column 3, line 30, after "linking" should be inserted --member--, line 35, "of" second occurrence shoul read --on--. Column 4, line 30, "of" should read --or--. Column 5, line 37, "factors" should read --Factors--.

Signed and Sealed this

Fourth Day of December 1979

[SEAL]

Attest:

SIDNEY A. DIAMOND

Attesting Officer

Commissioner of Patents and Trademarks